(12) United States Patent
Guo et al.

(10) Patent No.: US 8,434,700 B2
(45) Date of Patent: May 7, 2013

(54) METHODS AND SYSTEMS FOR MIXING REACTOR FEED

(75) Inventors: Cliff Yi Guo, Sugar Land, TX (US);
John Saunders Stevenson, Yorba Linda, CA (US); Dustin Wayne Davis, Ballston Lake, NY (US); Aaron John Avagliano, Houston, TX (US)

(73) Assignee: General Electric Company, Schenectady, NY (US)

( * ) Notice: Subject to any disclaimer, the term of this patent is extended or adjusted under 35 U.S.C. 154(b) by 522 days.

(21) Appl. No.: 12/112,281

(22) Filed: Apr. 30, 2008

(65) Prior Publication Data
US 2009/0272821 A1    Nov. 5, 2009

(51) Int. Cl.
*B05B 1/26* (2006.01)
*B05B 7/10* (2006.01)

(52) U.S. Cl.
USPC ......... 239/501; 239/402.5; 239/403; 239/405

(58) Field of Classification Search ............ 239/399, 239/402, 402.5, 403, 405; 60/740, 745, 748
See application file for complete search history.

(56) References Cited

U.S. PATENT DOCUMENTS

| | | | | |
|---|---|---|---|---|
| 2,578,121 A | * | 12/1951 | Bailey | 239/476 |
| 3,132,481 A | * | 5/1964 | Hasbrouck et al. | 60/258 |
| 3,642,202 A | | 2/1972 | Angelo | |
| 4,180,974 A | * | 1/1980 | Stenger et al. | 60/748 |
| 4,197,092 A | | 4/1980 | Bretz | |
| 4,426,841 A | * | 1/1984 | Cornelius et al. | 60/39.23 |
| 4,443,228 A | | 4/1984 | Schlinger | |
| 4,523,530 A | * | 6/1985 | Kaminaka et al. | 110/264 |
| 4,525,175 A | | 6/1985 | Stellaccio | |
| 4,803,836 A | * | 2/1989 | Blanton et al. | 60/39.464 |
| 4,845,940 A | * | 7/1989 | Beer | 60/732 |
| 4,865,542 A | | 9/1989 | Hasenack et al. | |
| 4,952,136 A | * | 8/1990 | Collins et al. | 431/183 |
| 5,281,243 A | | 1/1994 | Leininger | |
| 5,613,363 A | * | 3/1997 | Joshi et al. | 60/737 |
| 6,360,677 B1 | * | 3/2002 | Robillard et al. | 110/260 |
| 6,773,630 B2 | | 8/2004 | Stellaccio et al. | |

(Continued)

FOREIGN PATENT DOCUMENTS

| CA | 2215673 A1 | 3/1999 |
|---|---|---|
| CN | 1052889 A | 7/1991 |

(Continued)

OTHER PUBLICATIONS

Patent Cooperation Treaty, International Search Report, Sep. 12, 2009, 4 pages.

(Continued)

*Primary Examiner* — Len Tran
*Assistant Examiner* — Justin Jonaitis
(74) *Attorney, Agent, or Firm* — Armstrong Teasdale LLP

(57) ABSTRACT

Methods and systems for a feed injector are provided. The feed injector system includes a plurality of annular channels that are substantially concentric about a longitudinal axis. The plurality of annular channels direct a flow of fluid substantially axially therethrough from a respective source to a reaction zone. The feed injector system also includes a swirl member extending into the fluid flow path defined in at least one of the plurality of annular channels wherein the swirl member is configured to impart a circumferential flow direction to fluid flowing through the at least one annular channel.

23 Claims, 7 Drawing Sheets

U.S. PATENT DOCUMENTS

| | | | |
|---|---|---|---|
| 6,883,332 B2 * | 4/2005 | Steinthorsson et al. | 60/776 |
| 2006/0231645 A1 | 10/2006 | Chan | |
| 2007/0003897 A1 * | 1/2007 | Koizumi et al. | 431/354 |
| 2007/0186473 A1 * | 8/2007 | Wallace | 48/197 R |
| 2008/0175769 A1 * | 7/2008 | Goller et al. | 422/201 |
| 2008/0175770 A1 | 7/2008 | Wallace | |

FOREIGN PATENT DOCUMENTS

| | | |
|---|---|---|
| CN | 1125163 A | 6/1996 |
| CN | 1710333 A | 12/2005 |
| CN | 1873287 A | 12/2006 |
| EP | 0204912 A2 | 12/1986 |
| EP | 2113717 A2 | 11/2009 |
| GB | 994109 | 6/1965 |
| GB | 1191969 | 5/1970 |
| WO | 01/84050 A1 | 11/2001 |
| WO | 2006019523 A2 | 2/2006 |
| WO | 2007053310 A1 | 5/2007 |

OTHER PUBLICATIONS

Unofficial English translation of CN Office Action dated Nov. 5, 2012 from corresponding CN Application No. 200980116056.0.

* cited by examiner

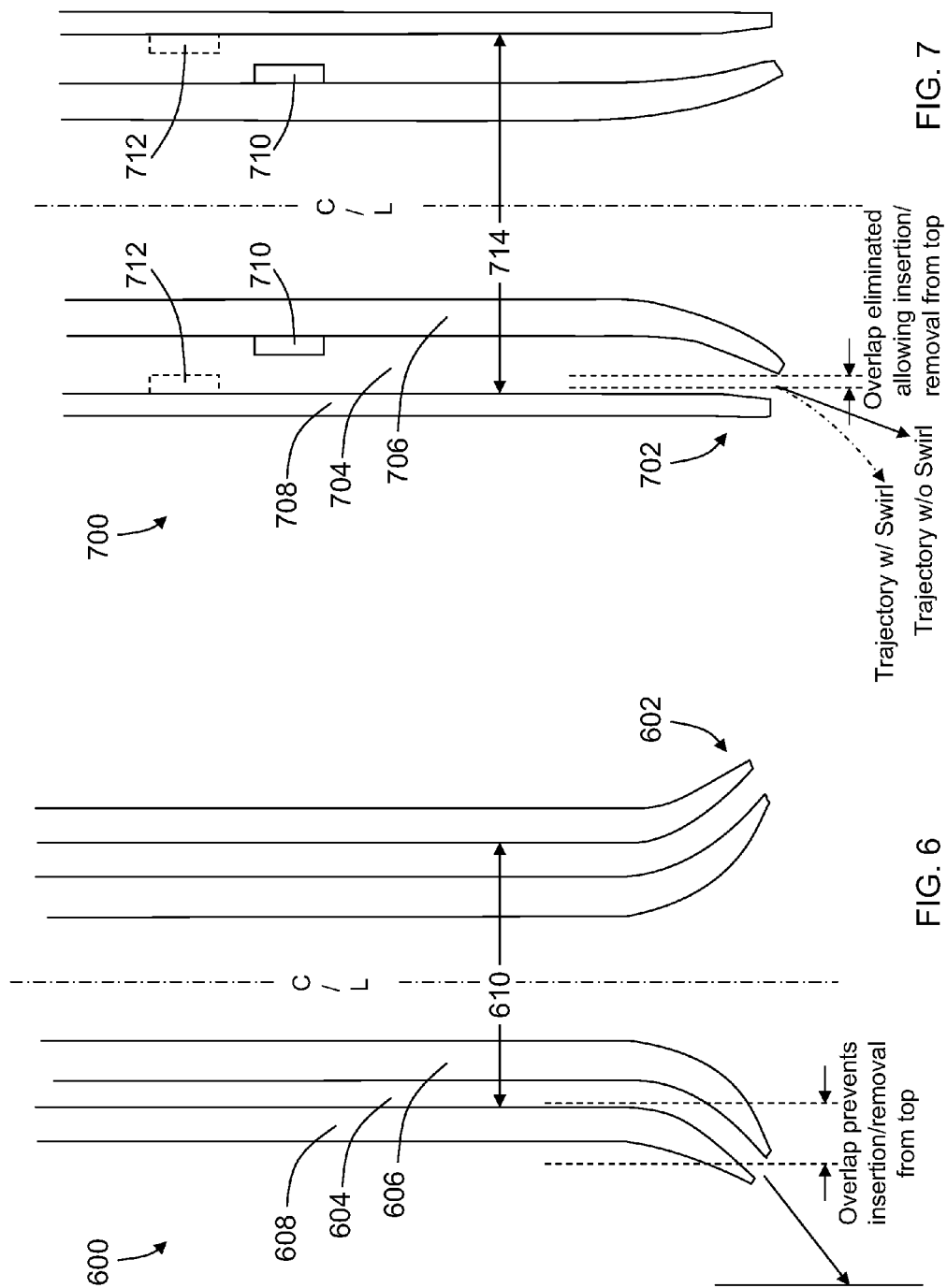

US 8,434,700 B2

METHODS AND SYSTEMS FOR MIXING REACTOR FEED

BACKGROUND OF THE INVENTION

This invention relates generally to gasification systems, and more specifically to advanced methods and apparatus for injecting feed into a gasifier.

At least some known gasifiers convert a mixture of fuel, air or oxygen, liquid water and/or steam, and/or slag into an output of partially oxidized gas, sometimes referred to as "syngas." In an integrated gasification combined-cycle (IGCC) power generation system, the syngas is supplied to the combustor of a gas turbine engine, which powers a generator that supplies electrical power to a power grid. Exhaust from the gas turbine engines may be supplied to a heat recovery steam generator that generates steam for driving a steam turbine. Power generated by the steam turbine also drives an electrical generator that provides electrical power to the power grid.

The fuel, air or oxygen, liquid water and/or steam, and/or slag additive are injected into the gasifier from separate sources through a feed injector that couples the feed sources to a feed nozzle. The feed sources traverse the feed injector separately and are joined together in a reaction zone downstream of the nozzle. For the reaction to complete in the short time the feed is in residence in the reaction zone, intimate mixing of the feed components needs to occur. At least some know gasification feed injectors include spraying the feed components at high velocity to encourage atomization, however such methods reduce the reaction time available and tend to inhibit a complete reaction.

BRIEF DESCRIPTION OF THE INVENTION

In one embodiment, a feed injector system includes a plurality of annular channels substantially concentric about a longitudinal axis that direct a flow of fluid substantially axially therethrough from a respective source to a reaction zone and a swirl member extending into the fluid flow path defined in at least one of the plurality of annular channels, the swirl member configured to impart a circumferential flow direction to fluid flowing through the at least one annular channel.

In another embodiment, a method of assembling a gasifier feed injector includes providing a first feed pipe having a first outside diameter about a longitudinal axis, the first pipe including a supply end, a discharge end, and a length extending therebetween and providing a second feed pipe having a first inside diameter, the second pipe including a supply end, a discharge end, and a length extending therebetween. The method further includes coupling a swirl member having a blade-shaped body to an outside surface of the first pipe at a position along the length of the first pipe, the swirl member extending along an outer surface of the first pipe at an oblique angle with respect to the longitudinal axis and inserting the first pipe into the second pipe such that the first pipe and the second pipe are substantially concentrically aligned.

In yet another embodiment, a gasification system includes a pressure vessel for partially oxidizing a fuel and a feed injector configured to inject a fuel into the pressure vessel wherein the feed injector further includes a plurality of annular channels that direct a flow of fluid substantially axially therethrough from a respective source to a reaction zone and a swirl member extending into the fluid flow path defined in at least one of the plurality of annular channels, the swirl member configured to impart a circumferential flow direction to fluid flowing through the at least one annular channel.

BRIEF DESCRIPTION OF THE DRAWINGS

FIG. 6 is a cross-sectional view of the outlet portion of an injector utilizing a diverging tip configuration; and FIG. 7 is a cross-sectional view of the outlet portion the injector in FIG. 6 after modification.

DETAILED DESCRIPTION OF THE INVENTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to a preferred embodiment, namely, systems and methods injecting feed into a reactor. However, it is contemplated that this disclosure has general application to piping systems in industrial, commercial, and residential applications.

Figure 1:
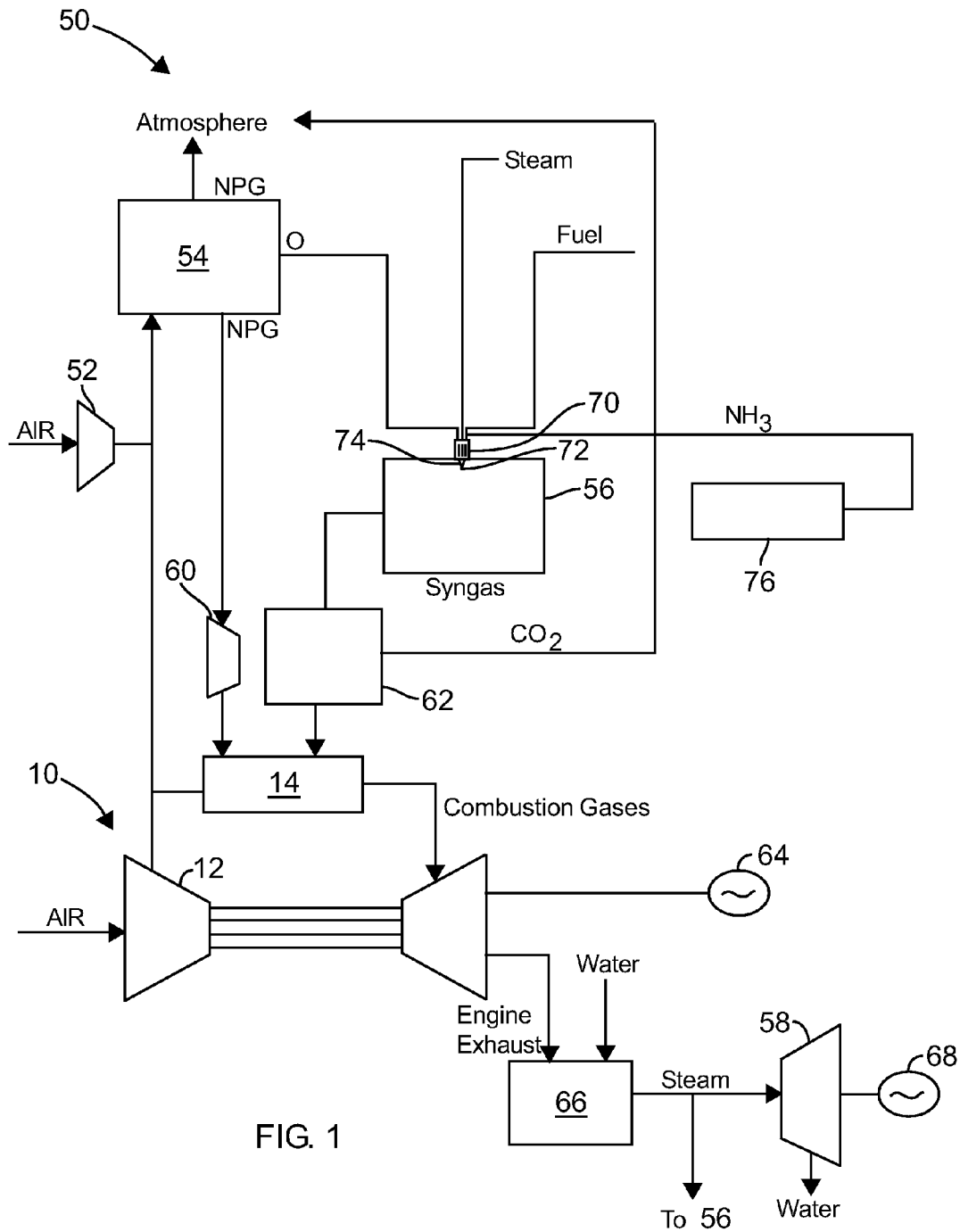
FIG. 1 is a schematic diagram of an exemplary known integrated gasification combined-cycle (IGCC) power generation system.

FIG. 1 is a schematic diagram of an exemplary integrated gasification combined-cycle (IGCC) power generation system 50. IGCC system 50 generally includes a main air compressor 52, an air separation unit 54 coupled in flow communication to compressor 52, a gasifier 56 coupled in flow communication to air separation unit 54, a gas turbine engine 10, coupled in flow communication to gasifier 56, and a steam turbine 58. In operation, compressor 52 compresses ambient air. The compressed air is channeled to air separation unit 54. In some embodiments, in addition or alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas." The process gas generated by air separation unit 54 includes nitrogen and will be referred to herein as "nitrogen process gas." The nitrogen process gas may also include other gases such as, but not limited to, oxygen and/or argon. For example, in some embodiments, the nitrogen process gas includes between about 95% and about 100% nitrogen. The oxygen flow is channeled to gasifier 56 for use in generating partially combusted gases, referred to herein as "syngas" for use by gas turbine engine 10 as fuel, as described below in more detail. In some known IGCC systems 50, at least some of the nitrogen process gas flow, a by-product of air separation unit 54, is vented to the atmosphere. Moreover, in some known IGCC systems 50, some of the nitrogen process gas flow is injected into a combustion zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the nitrogen process gas flow before being injected into the combustion zone.

Gasifier 56 converts a mixture of fuel, the oxygen supplied by air separation unit 54, liquid water and/or steam, and/or slag additive into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. In some known IGCC systems 50, the syngas generated by gasifier 56 includes carbon dioxide. The syngas generated by gasifier 56 may be cleaned in a clean-up device 62 before being channeled to gas turbine engine combustor 14 for combustion thereof. Carbon dioxide may be separated from the syngas during clean-up and, in some known IGCC systems 50, vented to the atmosphere. The power output from gas turbine engine 10 drives a generator 64 that supplies electrical power to a power grid (not shown). Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 66 is supplied to gasifier 56 for generating the syngas. In other known IGCC systems 50, thermal energy produced from the generation of syngas is used to generate additional steam for driving steam turbine 58.

Figure 2:
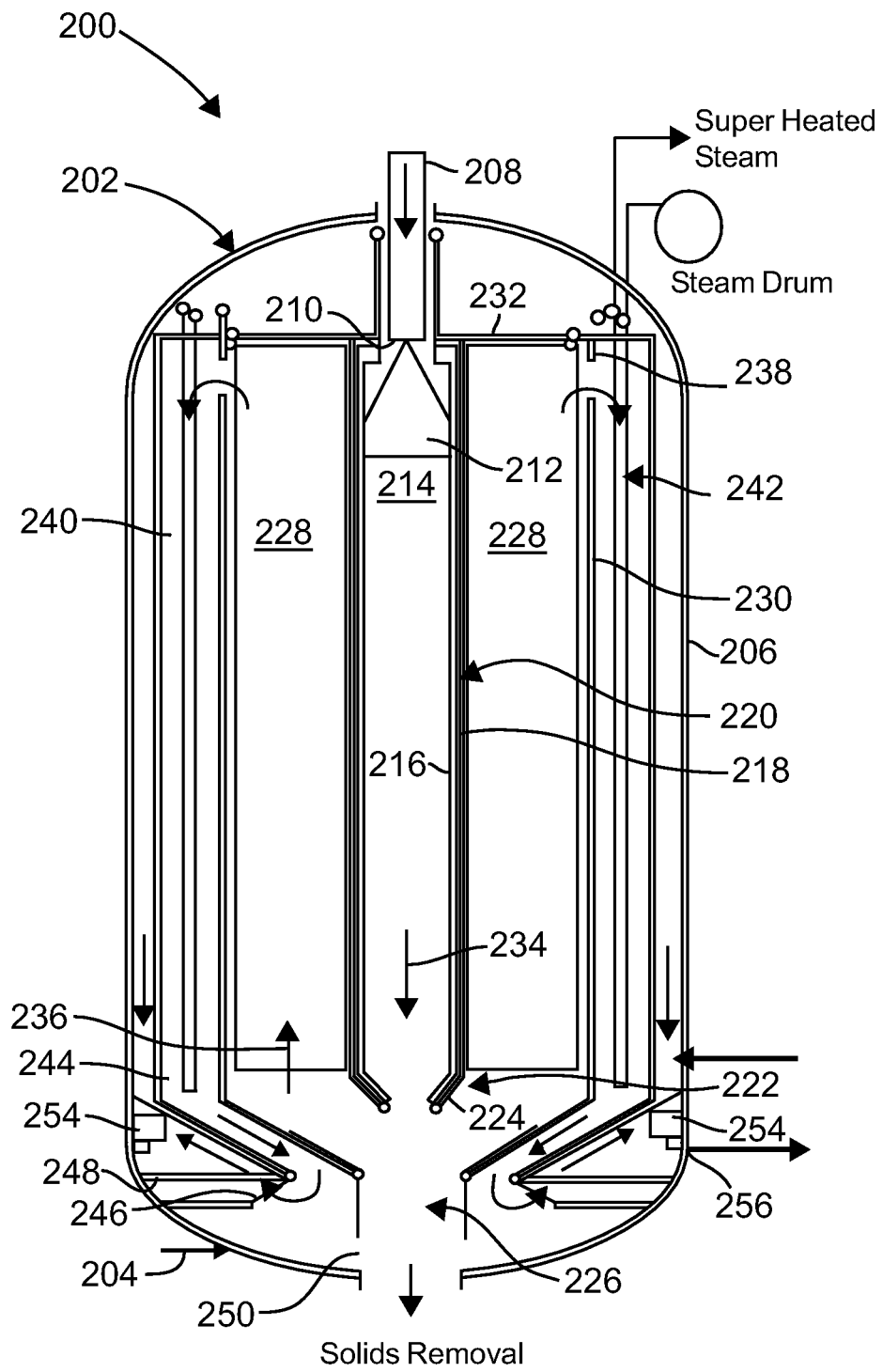
FIG. 2 is a schematic view of an exemplary embodiment of an advanced solids removal gasifier that may be used with the system shown in FIG. 1.

FIG. 2 is a schematic view of an exemplary embodiment of an advanced solids removal gasifier 200 that may be used with system 50 (shown in FIG. 1). In the exemplary embodiment, gasifier 200 includes an upper shell 202, a lower shell 204, and a substantially cylindrical vessel body 206 extending therebetween. A feed injector 208 penetrates upper shell 202 or vessel body 206 to channel a flow of fuel into gasifier 200. The fuel is transported through one or more passages in feed injector 208 and exits a nozzle 210 that directs the fuel in a predetermined pattern 212 into a combustion zone 214 in gasifier 200. The fuel may be mixed with other substances prior to entering nozzle 210 or may be mixed with other substances while exiting from nozzle 210. For example, the fuel may be mixed with fines recovered from a process of system 50 to increase the overall conversion of the fuel and/or mixed with slag additive to improve the melting behavior of any fuel ash prior to entering nozzle 210 and the fuel may be mixed with an oxidant, such as air or oxygen at nozzle 210 or downstream of nozzle 210.

In the exemplary embodiment, combustion zone 214 is a vertically oriented substantially cylindrical space co-aligned and in serial flow communication with nozzle 210. An outer periphery of combustion zone 214 is defined by a refractory wall 216 comprising a structural substrate, such as an Incoloy pipe 218 and a refractory coating 220 configured to resist the effects of the relatively high temperature and high pressure contained within combustion zone 214. An outlet end 222 of refractory wall 216 includes a convergent outlet nozzle 224 configured to maintain a predetermined back pressure in combustion zone 214 while permitting products of combustion and syngas generated in combustion zone 214 to exit combustion zone 214. The products of combustion include gaseous byproducts, a slag formed generally on refractory coating 220 and fine particulates carried in suspension with the gaseous byproducts.

After exiting combustion zone 214, the flowable slag and solid slag fall by gravity influence into a solids quench pool 226 in lower shell 204. Solids quench pool 226 is maintained with a level of water that quenches the flowable slag into a brittle solid material that may be broken in smaller pieces upon removal from gasifier 200. Solids quench pool 226 also traps approximately ninety percent of fine particulate exiting combustion zone 214.

In the exemplary embodiment, an annular first passage 228 at least partially surrounds combustion zone 214. First passage 228 is defined by refractory wall 216 at an inner periphery and a cylindrical shell 230 coaxially aligned with combustion zone 214 at a radially outer periphery of first passage 228. First passage 228 is closed at the top by a top flange 232. The gaseous byproducts and remaining ten percent of the fine particulate are channeled from a downward direction 234 in combustion zone 214 to an upward direction 236 in first passage 228. The rapid redirection at outlet nozzle 224 facilitates fine particulate and slag separation from the gaseous byproducts.

The gaseous byproducts and remaining ten percent of the fine particulate are transported upward through first passage 228 to a first passage outlet 238. During the transport of the gaseous byproducts through first passage 228, heat may be recovered from the gaseous byproducts and the fine particulate. For example, the gaseous byproducts enter first passage 228 at a temperature of approximately 2500° Fahrenheit and when exiting first passage 228 the temperature of gaseous byproducts is approximately 1800° Fahrenheit. The gaseous byproducts and fine particulates exit first passage 228 through first passage outlet 238 into a second annular passage 240 where the gaseous byproducts and fine particulates are redirected to a downward flow direction. As the flow of gaseous byproducts and the fine particulates is transported through second passage 240, heat may be recovered from the flow of gaseous byproducts and the fine particulates using for example, superheat tubes 242 that remove heat from the flow of gaseous byproducts and the fine particulates and transfer the heat to steam flowing through an inside passage of superheat tubes 242. For example, the gaseous byproducts enter second passage 240 at a temperature of approximately 1800° Fahrenheit and exit second passage 240 at a temperature of approximately 1500° Fahrenheit. When the flow of gaseous byproducts and the fine particulates reach a bottom end 244 of second passage 240 that is proximate lower shell 204, second passage 240 converges toward solids quench pool 226. At bottom end 244, the flow of gaseous byproducts and the fine particulates is channeled in an upward direction through a water spray 246 that cools the flow of gaseous byproducts and the fine particulates. The heat removed from the flow of gaseous byproducts and the fine particulates tends to vaporize water spray 246 and agglomerate the fine particulates such that the fine particulates form a relatively larger ash clod that falls into lower shell 204. The flow of gaseous byproducts and the remaining fine particulates are channeled in a reverse direction and directed to an underside of a perforated plate 248 plate forms an annular tray circumscribing bottom end 244. A level of water is maintained above perforated plate 248 to provide a contact medium for removing additional fine particulate from the flow of gaseous byproducts. As the flow of gaseous byproducts and the remaining fine particulates percolates up through the perforations in perforated plate 248, the fine particulates contact the water and are entrapped in the water bath and carried downward through the perforations into a sump of water in lower shell 204. A gap 250 between a bottom of solids quench pool 226 and lower shell 204 permits the fine particulates to flow through to solids quench pool 226 where the fine particulates are removed from gasifier 200.

An entrainment separator 254 encircles an upper end of lower shell 204 above perforated plate 248 and the level of water above perforated plate 248. Entrainment separator 254 may be for example, a cyclonic or centrifugal separator comprises a tangential inlet or turning vanes that impart a swirling motion to the gaseous byproducts and the remaining fine particulates. The particulates are thrown outward by centrifugal force to the walls of the separator where the fine particulates coalesce and fall down a wall of the separator lower shell 204. Additionally, a wire web is used to form a mesh pad wherein the remaining fine particulates impact on the mesh pad surface, agglomerate with other particulates drain off with the aid of a water spray by gravity to lower shell 204. Further, entrainment separator can be of a blade type such as a chevron separator or an impingement separator. In the chevron separator, the gaseous byproducts pass between blades and are forced to travel in a zigzag pattern. The entrained particulates and any liquid droplets cannot follow the gas streamlines, so they impinge on the blade surfaces, coalesce, and fall back into lower shell 204. Special features such as hooks and pockets can be added to the sides of the blades to facilitate improving particulates and liquid droplet capture. Chevron grids can be stacked or angled on top of one another to provide a series of separation stages. Impingement separators create a cyclonic motion as the gaseous byproducts and fine particulates pass over curved blades, imparting a spinning motion that causes the entrained particulates and any liquid droplets to be directed to the vessel walls, where the entrained particulates and any liquid droplets are collected and directed to lower shell 204.

The flow of gaseous byproducts and any remaining fine particulates enter separator 254 where substantially all of the remaining entrained particulates and any liquid droplets are removed from the flow of gaseous byproducts. The flow of gaseous byproducts exits the gasifier through an outlet 256 for further processing.

Figure 3:
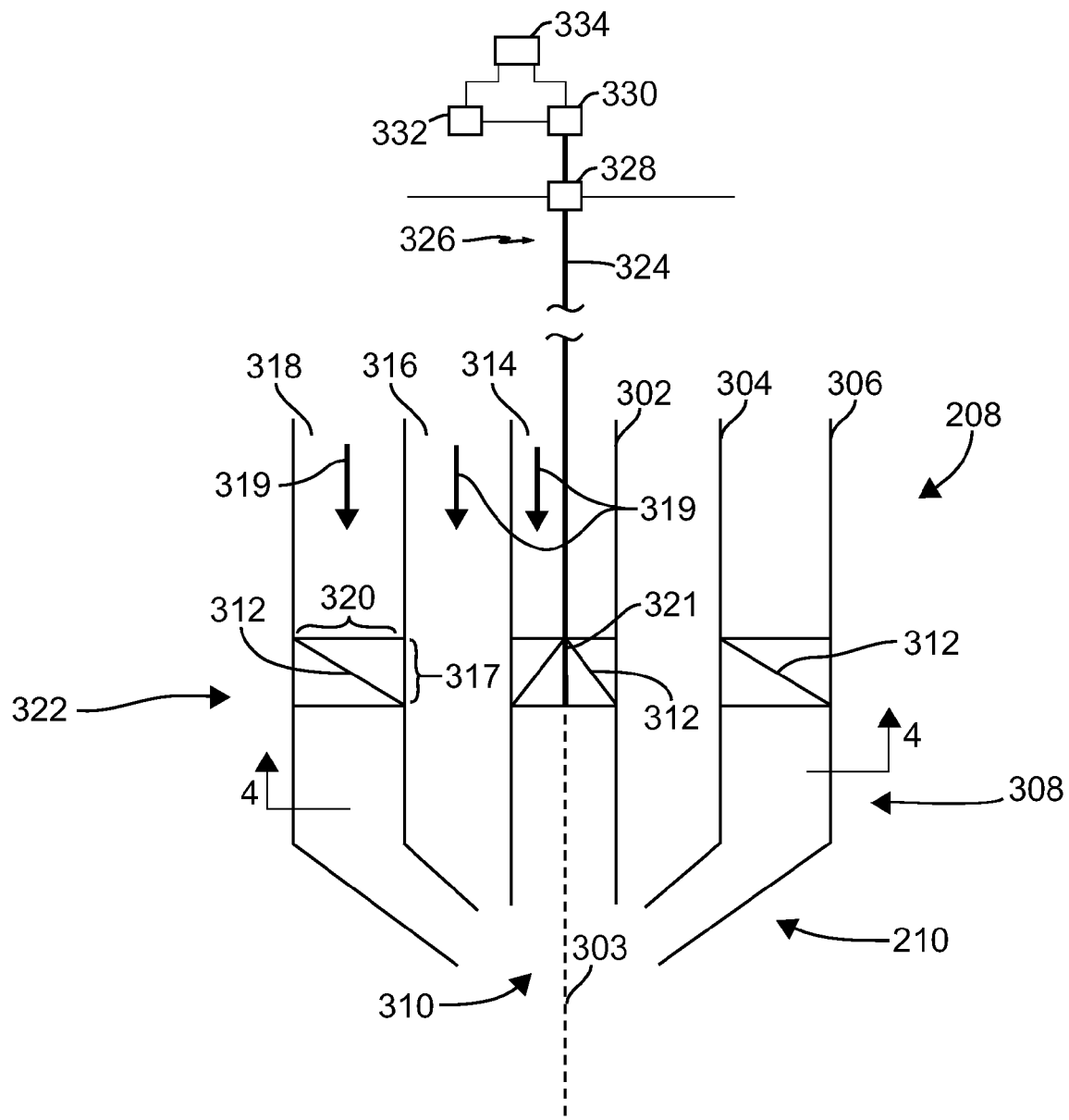
FIG. 3 is an enlarged cross-sectional view of the feed injector shown in FIG. 2 in accordance with an embodiment of the present invention.

FIG. 3 is an enlarged cross-sectional view of feed injector 208 (shown in FIG. 2) in accordance with an embodiment of the present invention. In the exemplary embodiment, feed injector 208 includes a central feed stream conduit 302 having a longitudinal axis 303, and annular feed stream conduits 304 and 306 generally concentric about longitudinal axis 303 that converge at an outlet end 308 of nozzle 210 to form an outlet orifice 310.

During operation, fuel injector 208 provides a feed stream of carbonaceous fuel through conduit 304 and primary and secondary oxidizer flow through conduits 302 and 306. In an alternative embodiment, conduit 304 provides a pumpable liquid phase slurry of solid carbonaceous fuel such as, for example, a coal-water slurry. The oxygen containing gas and carbonaceous slurry stream merge at a predetermined distance from the outlet orifice 310 of fuel injector nozzle 210 generally proximate to the nozzle outlet end 308 to form a reaction zone (not shown) wherein the emerging fuel stream self-ignites. Self-ignition of the fuel stream is enhanced by the breakup or atomization of the merging fuel streams as they exit from nozzle outlet orifice 310. Such atomization promotes the product reaction and heat development that is required for the gasification process. As a result, the reaction zone that is in close proximity to the outlet end 308 of the fuel injector nozzle 210 is characterized by intense heat, with temperatures ranging from approximately 2100° F. to 3000° F. To propel the streams sufficiently for the reaction zone to form a distance away from nozzle outlet orifice 310, the streams discharge from conduits 302, 304, and 306 at a relatively high velocity. Vigorous commingling of the fuel, oxidizer, and any other feed streams is used to further enhance atomization. A swirl member 312 is positioned within at least some of fluid flow channels 314, 316, 318 that are defined within conduit 302 and between conduits 304 and 302, and between conduits 304 and 306, respectively.

Swirl members 312 include a length 317 in a direction 319 of fluid flow and a width 320. In the exemplary embodiment, swirl members 312 are coupled to an outer surface of one or more of conduits 302 or 304. Additionally, swirl members 312 may be coupled to a centerbody 321 that may be inserted into central feed stream conduit 302 such that centerbody 321 is substantially aligned with axis 303. Swirl members 312 are aligned obliquely with respect to axis 303 such that fluid flow in axial direction 319 is directed circumferentially about a respective channel in which the swirl member 312 is encountered. The swirl in the fluid flow facilitates atomization of the fluid at orifice 310 and downstream of orifice 310. The atomization aids self-ignition and promotes a more complete oxidation of the fuel by for example, but not limited to increasing a particle residence time proximate the oxidizer to improve carbon conversion. In an alternative embodiment, swirl members 312 are attached or formed on the inside surfaces of one or more conduits 302, 304, or 306. In still another embodiment, swirl members 312 are fabricated or formed as replaceable or partially replaceable inserts that are held in place by any suitable means internally to conduits 302, 304, and 306 or externally to conduits 302 and 304. In yet another embodiment, swirl members 312 also are designed to constrain the relative movement of two or more conduits, thereby helping to ensure the proper internal alignment and operation of the injector, such as might be effected by incorporating a raised surface or landing along the inner diameter or outer diameter of the conduit engaging with the swirl members 312 during assembly, so that the corresponding inner diameter or outer diameter of the raised surface or landing is smaller or larger in diameter, respectively, than the surfaces of the conduit over which the swirl members 312 pass during assembly and disassembly.

In the exemplary embodiment, swirl members 312 are formed as relatively short blades in direction of flow 319. In an alternative embodiment, swirl members 312 are formed substantially equal to a length of an associated one of conduits 302, 304, and 306. In another alternative embodiment, swirl members 312 are formed of an intermediate length predetermined to impart a desired circumferential velocity component to the flow of fluid through the respective channel. In one embodiment, leading and/or trailing edges of swirl members 312 are curved to facilitate the flow of fluid past swirl members 312. In the exemplary embodiment, a set 322 of a plurality of swirl members 312 are spaced circumferentially at a single axial position along the length of the associated channel. In other embodiments, a plurality of sets of swirl members 312 may be spaced circumferentially about the associated channel spaced axially along the length of conduit 302. Swirl members 312 or sets 322 of swirl members 312 may be positioned equidistant along the length of the associated channel or may be spaced at positions determined to facilitate imparting a desired circumferential velocity component to the flow of fluid through the respective channel. In another embodiment, centerbody 321 comprises a connecting rod 324 that is aligned coincident with center line 303 and suspended from the supply end 326 of conduit 302 of feed injector 208 using for example, but not limited to a fitting or blind flange 328 located at and removably coupled to the supply end 326 of conduit 302. Connecting rod 324 may also comprise an extension of centerbody 321. Connecting rod 324 may be manipulated axially manually or using an actuator 330, a position sensor 332, and a controller 334 such that an axial position of centerbody 321 and swirlers 312 may be modified during operation of gasifier 56. To facilitate minimizing the binding of the surfaces of swirl member 312 with conduits 302, 304, and 306, an appropriate gas or liquid may be channeled to selected surfaces of swirl members 312 and/or conduits 302, 304, and 306 or channels 314, 316, and 318 to serve as a lubricant. In an alternative embodiment, one or more of the surfaces of swirl members 312, conduits 302, 304, or 306, and/or channels 314, 316, and 318 may be coated and/or fabricated from one or more appropriate self lubricating or low friction materials.

Figure 4:
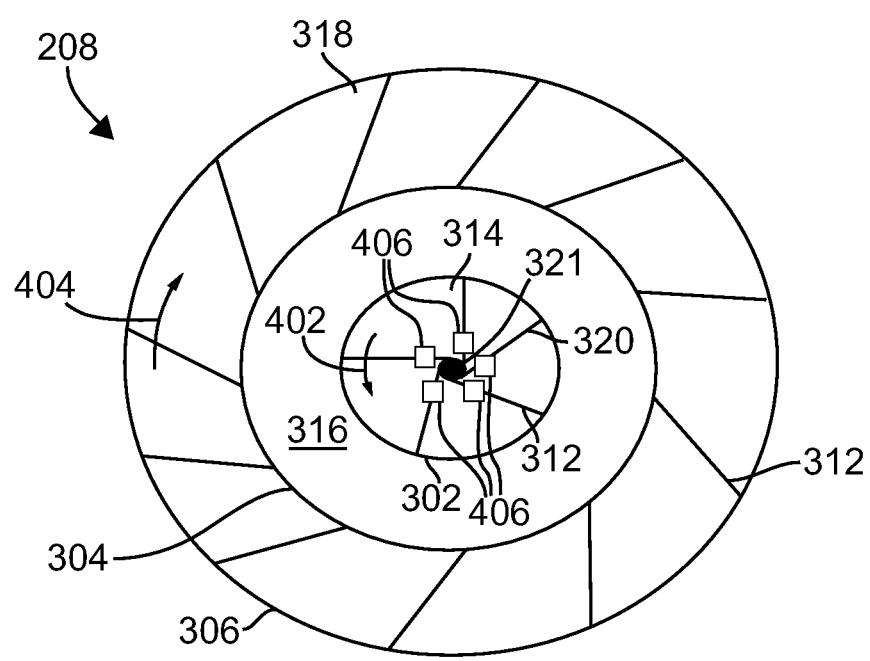
FIG. 4 is a cross-sectional view of the feed injector shown in FIG. 3 taken along view 4-4.

FIG. 4 is a cross-sectional view of feed injector 208 taken along view 4-4 (shown in FIG. 3). In the exemplary embodiment, feed injector 208 includes conduits 302, 304, and 306 illustrated concentrically aligned. Conduits 302, 304, and 306 define flow channels 314, 316, and 318, through which fuel and/or oxidizer flow. Channel 314 includes a plurality of swirl members 312 coupled to a centerbody 321. In the exemplary embodiment, swirl members 312 are not coupled to conduit 302, but are frictionally engaged with a surface of conduit 302 to maintain a stable position in channel 314 while facilitating fabrication of injector 208.

Channel 318 includes a plurality of swirl members 312 coupled radially to an outer surface of conduit 304. In the exemplary embodiment, swirl members 312 are not coupled to conduit 306, but are frictionally engaged with a surface of conduit 306 to maintain a stable position in channel 318 while facilitating fabrication of injector 208. During fabrication, a predetermined number of swirl members 312 may be coupled to centerbody 321 spaced circumferentially about centerbody 321. Centerbody 321 is inserted into channel 314 and secured in a predetermined position. Similarly, a predetermined number of swirl members 312 may be coupled to conduit 304 spaced circumferentially about conduit 304. Conduit 304 is inserted into channel 318 and secured in a predetermined position.

Swirl members 312 in channel 314 and channel 318 induce a tangential velocity in the fluid flowing in the respective channels such as oxygen. In the exemplary embodiment, the swirl directions in channel 314 and channel 318 are counter-cocurrent, for example, a first swirl direction 402 in channel 314 maybe in a counterclockwise direction and a second swirl direction in channel 318 may be oriented in a clockwise direction 404. Counter-cocurrency of the flows in alternate flow streams facilitates increasing the shear stress between the oxygen flow and coal slurry films to form a smaller droplet size. Because the trajectories of the particles follow a helical path rather than a straight-line path, the effective residence time is increased. In various other embodiments, one or more swirler actuators 402 are coupled to swirl members 312 such that a pitch or position of swirl members 312 may be controlled from external to gasifier 56. In one embodiment, one or more swirl members 312 are coupled to a respective swirler actuator 406. In another embodiment, swirl members 312 are ganged to a single swirler actuator 406 that is configured to control the pitch or position of swirl members 312 coupled to the single swirler actuator 406. Swirler actuator 406 is coupled to an actuator rod (not shown) that may be substantially similar to connecting rod 324. The actuator rod may extend through upper shell 202 to permit manipulation of swirler actuator 406 from external to gasifier 56 using for example, but not limited to a fitting or blind flange 328 located at and removably coupled to the supply end 326 of conduit 302.

Figure 5A:
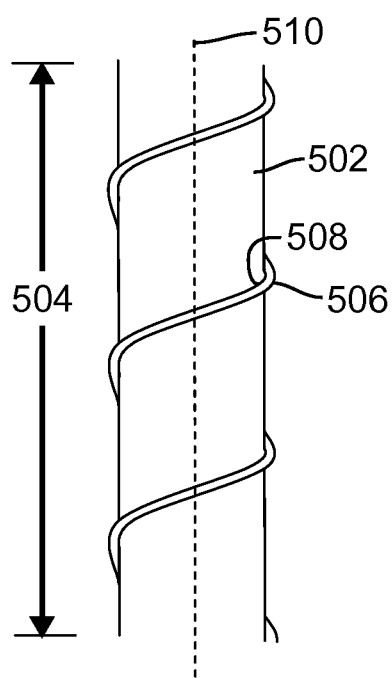
FIGS. 5A, 5B, and 5C are side elevation views of exemplary swirl members that may be used with the feed injector 208 shown in FIG. 2.
Figure 5B:
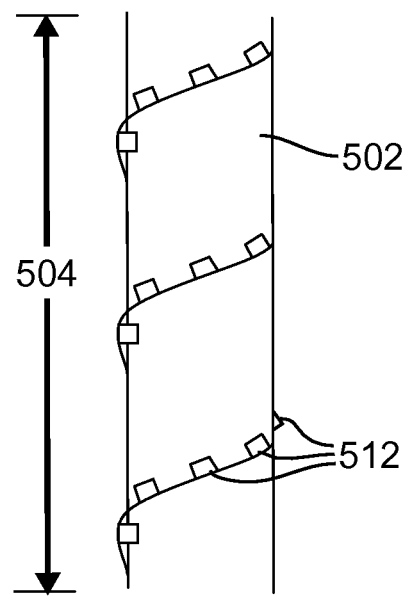
Figure 5C:
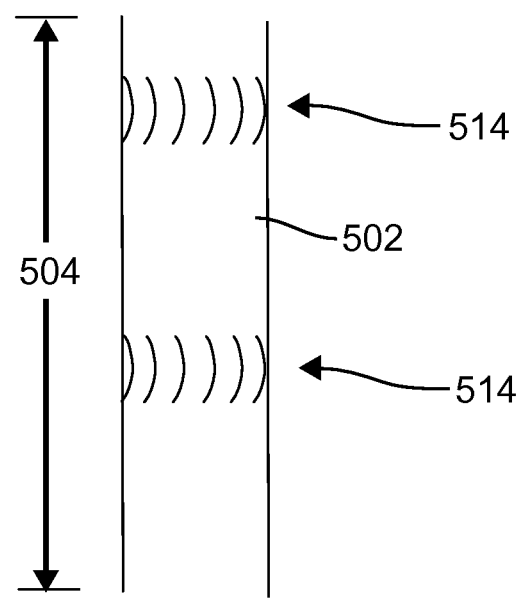

FIGS. 5A, 5B, and 5C are side elevation views of exemplary swirl members that may be used with feed injector 208 (shown in FIG. 2). In the exemplary embodiment, a centerbody 502 extends for a distance 504 typically with a cylindrical conduit, pipe, or duct (not shown in FIGS. 5A-C). Centerbody 502 may comprise a solid or hollow member that does not channel flow or may be a conduit that channels flow therethrough. An elongate blade 506 is coupled to centerbody 502 along an arcuate path 508 about an outer surface of centerbody 502. Arcuate path 508 is aligned obliquely with respect to a longitudinal axis 510 of centerbody 502. As illustrated in FIG. 5B the swirl members may comprise a plurality of relatively shorter blades 512 spaced along centerbody 502. In the exemplary embodiment, blades 512 are spaced along a helical path about centerbody 502. In an alternative embodiment, blades are positioned in accordance with a predetermined pattern that facilitates swirling the feed traversing the respective conduit. Blades 512 may extend only partially into the respective conduit or may extend to an inner surface of an adjacent conduit. In another alternative embodiment, a plurality of blades may be organized into sets 514 of blades that are spaced circumferentially about centerbody 502 at a substantially similar axial location about centerbody 502. Sets 514 may be spaced axially at positions predetermined to impart a predetermined amount of swirl or circumferential flow component to the feed flowing through the respective conduit.

FIG. 6 is a side elevation view of an injector 600 comprising a diverging tip 602 that may be used with gasifier 200 (shown in FIG. 2). In the exemplary embodiment, injector 600 includes a diverging annular channel 604 formed between a radially inner conduit 606 and a radially outer conduit 608. To achieve a desired outward radial component of momentum of a fluid flow being directed through channel 604, a curvature and extent of conduit 606 and a radially outer conduit 608 proximate tip 602 may be such that injector 600 may be difficult to fabricate and maintain because inner tip forming conduit 606 cannot be inserted or removed past an inner diameter 610 of conduit 608.

FIG. 7 is a side elevation view of an injector 700 comprising a diverging tip 702 that may be used with gasifier 200 (shown in FIG. 2). In the exemplary embodiment, injector 700 includes a diverging annular channel 704 formed between a radially inner conduit 706 and a radially outer conduit 708. To achieve a desired outward radial component of momentum of a fluid flow being directed through channel 704, swirl members 710 may be positioned along a radially outer surface of conduit 706. Alternatively, swirl members 712 may be positioned along a radially inner surface of conduit 708. The additional circumferential component of the fluid flow is sufficient to achieve the desired outward radial component of momentum of the fluid flow without having to extend inner conduit 706 far enough to interfere with an inner diameter 714 of conduit 708. During installation or maintenance conduit 706 is capable of being removed from the inlet end of conduit 708.

In an injector comprising a diverging tip, assembly and servicing of the feed injector may be difficult when the outer diameter of and/or protrusions from the outside surface of the inner conduit forming a fluid flow channel is larger than corresponding inner diameter of the inside surface of the next larger conduit forming such fluid flow channel. The swirl members may be used in such a case to induce a radial component of momentum to the corresponding fluid flow, allowing the use of modified and/or less severe angles in the diverging tip, thereby overcoming the difficulties of assembly and servicing. The swirl members can further be configured such that there is no or limited change in the relative fluid flows through each channel. Additionally, the swirl members may be used in an adjacent flow channel to help reduce or augment the net angular momentum of the corresponding fluids during mixing.

As used herein "fluid" refers to any composition that can flow such as but not limited to semi-solids, pastes, solutions, aqueous mixtures, gels, lotions, creams, dispersions, emulsions, foams, suspensions, microemulsions, gases, vapors, and other such compositions.

The above-described methods and systems of injecting feed into a reactor are cost-effective and highly reliable. The methods and systems facilitate atomization of the feed leading to increased particle residence time to improve carbon conversion, promote self-ignition and a more complete oxidation of the fuel. Accordingly, the methods and systems facilitate the operation of a partial oxidation system in a cost-effective and reliable manner.

While the invention has been described in terms of various specific embodiments, it will be recognized that the invention can be practiced with modification within the spirit and scope of the claims.

What is claimed is:

1. A feed injector system comprising:
    a plurality of annular channels substantially concentric about a longitudinal axis that define corresponding fluid flow paths that direct a flow of fluid substantially axially therethrough from a respective source to a reaction zone; and
    a plurality of swirl members extending into the fluid flow path defined in at least one of said plurality of annular channels, wherein at least one of said plurality of swirl members is movable axially within said at least one annular channel, wherein at least one of said plurality of swirl members comprises a plurality of blades aligned in a helical path spaced axially and circumferentially with respect to an adjacent swirl member in the helical path, and wherein at least one of said plurality of swirl members is configured to impart a first circumferential flow direction to fluid flowing through at least one of said plurality of annular channels, and at least one of said plurality of swirl members is configured to impart a second circumferential flow direction to fluid flowing through at least one of said plurality of annular channels, wherein the second circumferential flow direction is different than the first circumferential flow direction, and wherein a tangential velocity of the fluid is based on at least one of a pitch and a position of said plurality of swirl members.

2. A system in accordance with claim 1 wherein at least one of said plurality of swirl members comprises a body extending into at least one of said plurality of annular channels obliquely with respect to the longitudinal axis.

3. A system in accordance with claim 1 wherein said plurality of substantially concentric annular channels comprises:
    a first conduit substantially cylindrically shaped about a longitudinal axis, said first conduit comprising a radially outer surface and a radially inner surface, said first conduit further comprising a supply end, a discharge end and a length extending therebetween;
    a second conduit at least partially within and substantially concentrically aligned with said first conduit, said second conduit substantially cylindrically shaped about the longitudinal axis, said second conduit comprising a radially outer surface and a radially inner surface, said second conduit further comprising a supply end, a discharge end, and a length extending therebetween.

4. A system in accordance with claim 3 wherein at least one of said plurality of swirl members comprises a body extending radially inwardly from said inner surface of said first conduit into at least one of the plurality of annular channels, said at least one swirl member extending helically with respect to the longitudinal axis.

5. A system in accordance with claim 3 wherein at least one of said plurality of swirl members comprises a body extending radially outwardly from said outer surface of said second conduit into at least one of the plurality of annular channels, said at least one swirl member extending helically with respect to the longitudinal axis.

6. A system in accordance with claim 1 wherein said plurality of swirl members are spaced circumferentially about at least one of said plurality of channels, said swirl members aligned obliquely with respect to the longitudinal axis.

7. A system in accordance with claim 1 wherein said plurality of swirl members are spaced circumferentially about two of said plurality of channels, said swirl members in a first of the channels are aligned obliquely with respect to the longitudinal axis, said swirl members in a second of the channels are aligned obliquely in an opposite direction from the swirl members in the first channel.

8. A system in accordance with claim 1 wherein at least one of said plurality of swirl members comprises an elongated blade integral with and extending outwardly into at least one of said plurality of annular channels for a substantial length of said at least one channel.

9. A system in accordance with claim 8 wherein at least one of said plurality of swirl members is aligned along at least one of a helical path and a helical path having a variable pitch.

10. A system in accordance with claim 1 wherein said plurality of blades extend outwardly into at least one of said plurality of annular channels.

11. A system in accordance with claim 1 further comprising an actuator coupled to at least one of said plurality of swirl members, said actuator configured to move said at least one swirl member axially in a respective one of said plurality of annular channels.

12. A system in accordance with claim 1 further comprising an actuator coupled to at least one of said plurality of swirl members, said actuator configured to rotate said at least one swirl member such that a pitch of said at least one swirl member with respect to the longitudinal axis is changed.

13. A system in accordance with claim 1 further comprising:
    a first conduit having a first radially outwardly diverging tip; and
    a second conduit concentrically aligned about a longitudinal axis of said first conduit and radially outward from said first conduit, forming at least one of said plurality of annular channels;
    wherein a radially outer diameter of said first conduit proximate said tip is less than an inner diameter of second conduit such that said tip is axially removable through said second conduit.

14. A system in accordance with claim 1 further comprising:
    a first conduit comprising a first radially outwardly diverging tip; and
    a second conduit substantially concentrically aligned about said first conduit and spaced radially outward from said first conduit, said second conduit forming at least one of said plurality of annular channels,
    wherein said second conduit comprises a second diverging tip having an inner diameter that is larger than an inner diameter of said second conduit, wherein a radially outer diameter of said first conduit proximate said tip is greater than an inner diameter of said second conduit such that said tip of said first conduit interferes with the inner diameter of said second conduit during removal of said first conduit axially through said second conduit, and wherein said first diverging tip imparts an angular trajectory to fluid exiting said first diverging-tip.

15. A method of assembling a gasifier feed injector comprising:
providing a first feed pipe having a first outside diameter about a longitudinal axis, the first pipe including a supply end, a discharge end, and a length extending therebetween;
providing a second feed pipe having a first inside diameter, the second pipe including a supply end, a discharge end, and a length extending therebetween;
providing a plurality of swirl members at a position along the length of at least one of the first pipe and the second pipe, wherein at least one of the plurality of swirl members is movable axially within at least one of the first pipe and the second pipe, at least one of the plurality of swirl members extends along a surface of the first pipe at an oblique angle with respect to the longitudinal axis such that the at least one swirl member imparts a first circumferential flow direction to a fluid that flows through the first pipe, and at least one of the plurality of swirl members extends along a surface of the second pipe such that the at least one swirl member imparts a second circumferential flow direction to a fluid that flows through the second pipe that is different in direction than the first circumferential flow direction, wherein at least one of the plurality of swirl members has a blade-shaped body that is formed integrally with an outer surface of the first pipe, and wherein the a tangential velocity of the fluid is based on at least one of the position and the angle of the swirl member; and
inserting the first pipe into the second pipe such that the first pipe and the second pipe are substantially concentrically aligned.

16. A method in accordance with claim 15 wherein providing a plurality of swirl members comprises at least one of coupling at least one of the plurality of swirl members having a blade-shaped body to an inner surface of the second pipe and coupling at least one of the plurality of swirl members with a blade-shaped body to an outside surface of the first pipe.

17. A method in accordance with claim 15 wherein providing a plurality of swirl members comprises providing at least one of the plurality of swirl members with a blade-shaped body formed integrally in an inner surface of the second pipe.

18. A method in accordance with claim 15 wherein providing a plurality of swirl members comprises coupling at least one of the plurality of swirl members along a helical path about at least one of the first pipe and the second pipe.

19. A method in accordance with claim 18 wherein coupling at least one of the plurality of swirl members along a helical path about at least one of the first pipe and the second pipe comprises coupling at least one of the plurality of swirl members along a helical path having a variable pitch about at least one of the first pipe and the second pipe.

20. A method in accordance with claim 15 wherein providing a plurality of swirl members comprises coupling a plurality of swirl members adjacently aligned along a helical path about at least one of the first pipe and the second pipe.

21. A method in accordance with claim 20 wherein coupling a plurality of swirl members adjacently aligned along a helical path about at least one of the first pipe and the second pipe comprises coupling at least one of the plurality of swirl members along a helical path having a variable pitch about at least one of the first pipe and the second pipe.

22. A method in accordance with claim 15 further comprising changing the axial position of at least one of the plurality of swirl members using an actuator coupled to the at least one swirl member.

23. A gasification system comprising:
a pressure vessel for partially oxidizing a fuel;
a feed injector configured to inject a fuel into the pressure vessel;
wherein the feed injector further comprises:
a plurality of annular channels that define corresponding fluid flow paths that direct a flow of fluid substantially axially therethrough from a respective source to a reaction zone; and
a plurality of swirl members extending into the fluid flow path defined in at least one of said plurality of annular channels, at least one of said plurality of swirl members comprises a plurality of blades extending outwardly into said at least one of said plurality of annular channels, at least one of said plurality of swirl members is configured to impart a first circumferential flow direction to fluid flowing through at least one of said annular channels, and at least one of said plurality of swirl members is configured to impart a second circumferential flow direction to fluid flowing through at least one of said annular channels that is different than the first circumferential flow direction, and wherein a tangential velocity of the fluid is based on at least one of a pitch and a position of said plurality of swirl members.

* * * * *